G. L. SIMPSON.
SAFETY LATCH FOR MOTOR VEHICLE DOORS.
APPLICATION FILED JAN. 29, 1919.
1,410,841. Patented Mar. 28, 1922.
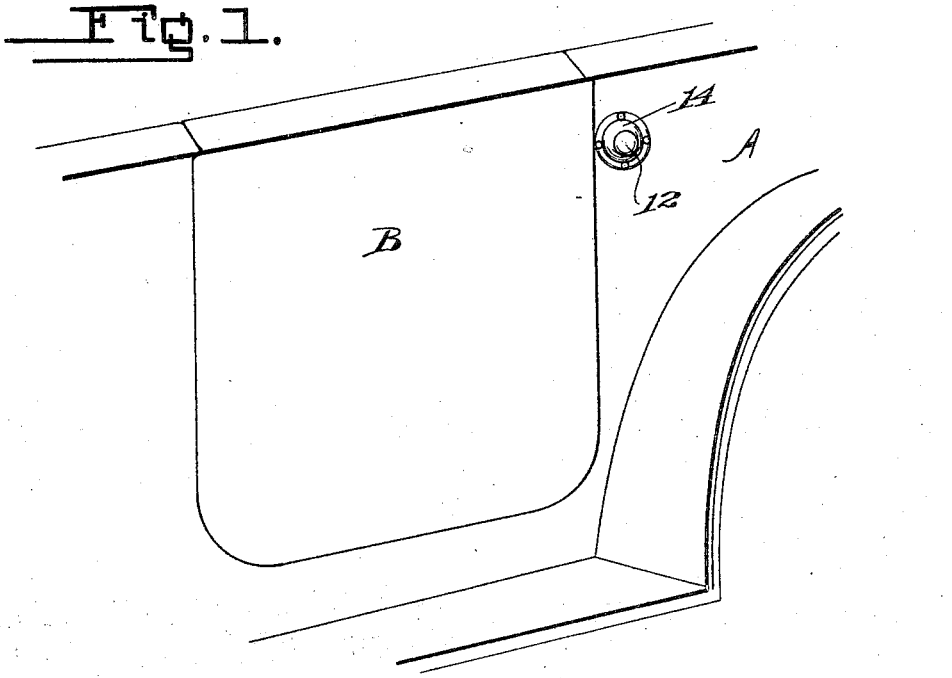
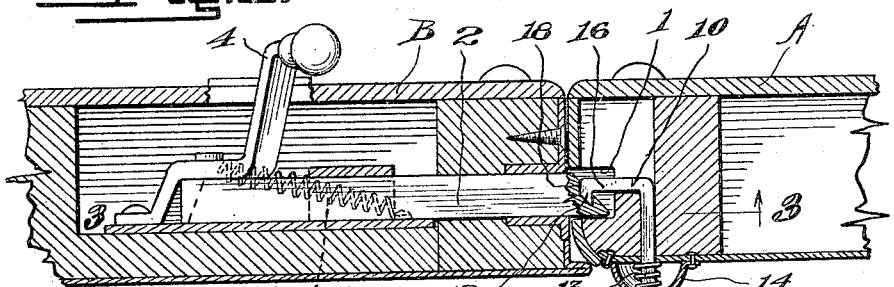
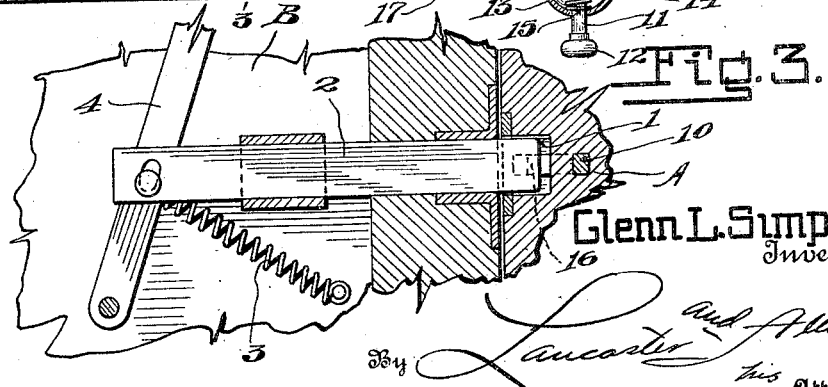
Glenn L. Simpson, Inventor

UNITED STATES PATENT OFFICE.

GLENN L. SIMPSON, OF WILEY, COLORADO.

SAFETY LATCH FOR MOTOR-VEHICLE DOORS.

1,410,841.     Specification of Letters Patent.     Patented Mar. 28, 1922.

Application filed January 29, 1919. Serial No. 273,797.

*To all whom it may concern:*

Be it known that I, GLENN L. SIMPSON, a citizen of the United States, residing at Wiley, in the county of Prowers and State of Colorado, have invented certain new and useful Improvements in Safety Latches for Motor-Vehicle Doors, of which the following is a specification.

This invention relates to latches for use on automobile doors and an object of the invention is to provide a latch structure which will prevent opening of the door when pressure is brought against the door from the inner side of the vehicle.

In automobile construction, latches for retaining the doors closed are such that often serious accidents occur by a person sitting against or sitting upon a door, the pressure of which causes the latch to release and allows the door to swing open, permitting the person who was leaning against the door to fall from the motor vehicle; it is an object of this invention to provide an auxiliary latch structure for use in connection with the usual type of door latch, to prevent the accidental operation of the latch or opening of the door by pressure thereagainst.

More specifically, the invention comprehends the provision of a substantially L-shaped bolt which is spring controlled and operated from the exterior of the automobile, having a relatively short tongue or tip upon the outer end of the base thereof which gives the bolt somewhat the same shape as a hook. This bolt engages in a recess in the bevelled end of the ordinary door latch, to retain the said latch against movement out of the keeper.

Other objects of the invention will appear in the following detailed description taken in connection with the accompanying drawings, forming a part of this specification and in which drawing:

Figure 1 is a fragmentary perspective view of an automobile, showing the safety latch applied thereto.

Figure 2 is a horizontal section through a part of the automobile body showing the relation of the safety latch to the usual or ordinary door latch.

Figure 3 is a section on the line 3—3 of Figure 2.

Referring more particularly to the drawings, A indicates the body of an ordinary automobile and B indicates the usual type of door associated therewith to permit the entrance of persons into or the exit from the automobile.

The body A is provided with a keeper recess 1 which receives therein the bevelled end of the sliding locking bolt 2 which forms a part of the ordinary latch structure for maintaining the door B closed. This sliding bolt is normally urged into the keeper recess 1 by a spring 3 and it is moved from the keeper recess by the pivotal operation of the operating lever 4, to permit the opening of the door B.

To prevent accidental operation of the bolt 2 to release the door B to allow it to open, under pressure or accidental conditions, a substantially L-shaped bolt 10 is provided, the stem 11 of which is projected outwardly to the outer surface or sides of the body A in close proximity to the door B. This L-shaped bolt 10 has a head upon its outer end giving the whole the appearance of a hook and which is adapted to be engaged by a person to operate the bolt and the head 12 and stem 11 are normally held in a projected position by a spring 13, which is housed in a suitable housing 14 attached to the outer surface of the automobile body. The spring 13 engages a transverse pin 15 extending through the stem 11 at one end and engages against the outer surface of the body A at its other end, it being an expansion spring will therefore hold the stem 11 and head 12 in an outward projected position. The base 16 of the bolt 10 is provided with a nib or tongue 17 upon its outer end adapted to seat in the recess 18 formed in the bevelled face of the bolt 2 and hold the bolt 2 against sliding. To open the door B when the improved safety latch is applied, it is necessary to force the hook-shaped bolt 11 inwardly sufficient to disengage its tongue or free end 17 from the recess 18 after which the bolt 2 may be moved out of the keeper opening 1 by pivotal movement of the latch lever 4. The spring 13 normally urges the bolt 10 outwardly, and will upon the movement of the bolt into the keeper opening 1, maintain the outer bevelled end of the tongue 17 in engagement with the bevelled face of the bolt 2, and cause the free end 17 of the bolt to move into the recess 18 when the bevelled end of the bolt is properly seated in the keeper recess 1. It will thus be seen that it will be practically impossible to accidentally operate the bolt 2, from the inside or outside of the car, since the lever 4 is positioned upon the inner side of the car while the stem 11 and the bolt 10 projects beyond the outer side of the car.

Changes in details may be made without departing from the spirit of this invention, but;

I claim:

1. In a safety latch for doors, the combination, of a latching bolt having a bevelled end and provided with a recess in the bevelled surface of said end, and an auxiliary latching bolt slidable transversely of the path of the first bolt, and provided with a tongue for movement into the recess to restrain movement of the first mentioned bolt, said tongue having its outer end bevelled for riding over the bevelled surface of said first mentioned bolt during the insertion of the latter into its keeper.

2. In a safety latch for swinging doors, the combination, of a longitudinally movable latching bolt having a beveled end and provided with a recess therein, and a substantially hook-shaped auxiliary bolt, the free end of said hook-shaped bolt being adapted for engagement in said recess to restrain movement of the longitudinally slidable bolt.

3. In a safety latch for automobile doors, the combination with an automobile body and a swinging door connected thereto, said door carrying a longitudinally movable latching bolt, said body provided with a keeper recess adapted to receive one end of said latching bolt, of an auxiliary substantially hook-shaped latching bolt carried by said body and movable transversely in the path of said first mentioned latching bolt, the free end of said hook-shaped bolt being adapted to engage the end of the first mentioned bolt positioned within said keeper recess to restrain the first mentioned bolt against movement.

4. In a safety latch for automobile doors, the combination of an automobile body and a swinging door connected thereto, said door carrying a longitudinally movable latching bolt, said body provided with a keeper recess adapted to receive one end of said latching bolt, an auxiliary substantially L-shaped latching bolt carried by said body and movable transversely in the path of the first mentioned latching bolt, a tongue on the free end of the base of said L-shaped bolt and adapted to engage the end of the first mentioned bolt positioned within said keeper recess to restrain the first mentioned bolt against movement, the stem of said L-shaped bolt extending outwardly through the outer side of the automobile body, and a spring engaging said stem to normally urge the tongue into engagement with the first mentioned latching bolt.

5. In a safety latch for automobile doors, the combination with an automobile body and a swinging door connected thereto, said door carrying a longitudinally movable latching bolt, said body provided with a keeper recess adapted to receive one end of said latching bolt, of a substantially hook-shaped auxiliary latching bolt carried by said body and movable transversely of and in the same horizontal plane as said first mentioned latching bolt that it may be operated in the wall of the car to restrain or release said first mentioned bolt.

GLENN L. SIMPSON.